United States Patent
Mark

(10) Patent No.: US 7,343,895 B2
(45) Date of Patent: Mar. 18, 2008

(54) FUEL INJECTION SYSTEM AND METHOD OF OPERATION FOR A GASEOUS FUELLED ENGINE WITH LIQUID PILOT FUEL IGNITION

(75) Inventor: Randall Mark, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/277,407

(22) Filed: Mar. 24, 2006

(65) Prior Publication Data
US 2006/0236974 A1  Oct. 26, 2006

Related U.S. Application Data

(63) Continuation of application No. PCT/CA2004/001668, filed on Sep. 10, 2004.

(51) Int. Cl.
F02M 43/04 (2006.01)
F02M 53/04 (2006.01)

(52) U.S. Cl. .................. 123/299; 123/27 GE; 123/304; 123/525; 239/132.5

(58) Field of Classification Search .......... 123/27 GE, 123/299, 304, 525; 239/132, 132.3, 132.5, 239/533.2, 584, 585.1
See application file for complete search history.

(56) References Cited

U.S. PATENT DOCUMENTS 4,245,589 A  1/1981  Ryan
4,811,701 A  3/1989  Bühl et al.
4,817,873 A * 4/1989  McKay .................... 239/132.1
5,076,244 A  12/1991  Donaldson
5,771,873 A  6/1998  Potter et al.
5,915,352 A  6/1999  Okamoto et al.
6,267,307 B1 * 7/2001  Pontoppidan ............. 239/585.1
7,070,126 B2 * 7/2006  Shinogle ...................... 239/584
2004/0026532 A1* 2/2004  Lambert et al. ............. 239/132

FOREIGN PATENT DOCUMENTS

| CA | 1037803 B | 9/1978 |
| CA | 2405350 C | 1/2003 |
| EP | 1256712 A2 | 11/2002 |
| JP | 62-298658 A | 12/1987 |
| JP | 05-149214 A | 6/1993 |
| JP | 5-200328 * 8/1993 | ................ 239/589 |
| JP | 09-310660 A | 12/1997 |

* cited by examiner

Primary Examiner—T. M Argenbright
(74) Attorney, Agent, or Firm—McAndrews, Held & Malloy, Ltd.

(57) ABSTRACT

A pilot fuel injection valve is mountable in a cylinder head of an engine and injects a liquid pilot fuel directly into a combustion chamber. The pilot fuel injection valve comprises a cooling system to keep the pilot fuel at a temperature that is lower than the lowest initial boiling point for the pilot fuel that occurs inside the fuel injection valve. The pilot fuel injection valve further comprises a thermally insulated nozzle having an outer surface that is not cooled by the cooler cylinder head and the cooler pilot fuel held inside the fuel injection valve. During operation, the nozzle's outer surface can be heated to a temperature that is not significantly lower than the final boiling point of the pilot fuel so that a significant amount of pilot fuel does not condense on the nozzle surface during engine operation.

61 Claims, 3 Drawing Sheets

FUEL INJECTION SYSTEM AND METHOD OF OPERATION FOR A GASEOUS FUELLED ENGINE WITH LIQUID PILOT FUEL IGNITION

CROSS-REFERENCE TO RELATED APPLICATION(S)

This application is a continuation of International Application No. PCT/CA2004/001668, having an international filing date of Sep. 10, 2004, entitled "A Fuel Injection System And Method Of Operation For A Gaseous Fuelled Engine With Liquid Pilot Fuel Ignition". International Application No. PCT/CA2004/001668 claimed priority benefits, in turn, from Canadian Patent Application No. 2,442,601 filed Sep. 26, 2003. International Application No. PCT/CA2004/001668 is hereby incorporated by reference herein in its entirety.

FIELD OF THE INVENTION

The present invention relates to a fuel injection system and method of operation for a gaseous-fuelled engine with liquid pilot fuel ignition.

BACKGROUND OF THE INVENTION

Developments in combustion engine technology have shown that compression ignition engines, frequently referred to as diesel-cycle engines, can be fuelled with gaseous fuels instead of diesel without sacrifices in performance or efficiency. Examples of such gaseous fuels include natural gas, methane, propane, ethane, gaseous combustible hydrocarbon derivatives and hydrogen. Substituting diesel with such gaseous fuels generally results in cost, availability and emissions benefits over diesel. Examples of emissions benefits include, compared to conventional diesel-fuelled engines, a reduction of at least about 75% in the level of particulate matter (commonly known as soot), a reduction by about half in the level of oxides of nitrogen (commonly known as NOx), and a reduction by about 25% in the level of carbon dioxide.

However, a problem with gaseous fuels such as natural gas is that, compared to diesel fuel, much higher temperatures and pressures are needed for auto-ignition. To overcome this problem an ignition assist mechanism can be employed to control ignition of gaseous fuels. One such ignition assist mechanism, which allows the major components and operational characteristics of diesel engines to be preserved, involves the injection of a small amount of more auto-ignitable pilot fuel such as conventional diesel fuel, to control the ignition of the gaseous fuel.

When diesel fuel is used as a pilot fuel the quantity of diesel fuel that is consumed can be less than 5% of the total fuel consumed on an energy basis. Delivering such a small amount of diesel fuel to an engine has consequences that do not normally occur in a conventional diesel engine, when a larger amount of diesel fuel is delivered to the engine. For example, in a conventional diesel engine, with the larger diesel mass flow rates being injected into the combustion chamber, and because the temperature of the diesel fuel delivered to the fuel injection valves is much lower than the temperature of the cylinder head and the temperature within the combustion chamber, the diesel fuel itself acts as a coolant so that the temperature of the diesel fuel within a conventional injection valve does not normally rise above the initial boiling temperature of liquid diesel fuels. It is easier to inject more fuel through the injection valve when the diesel fuel is in a liquid state, so ideally the fuel remains a liquid until it exits the nozzle orifice and is vaporized inside the combustion chamber.

Diesel fuel is not composed of a simple compound, meaning that diesel fuel is made up of a mixture of different compounds each one having a different boiling point. There are different grades of diesel fuel with different compositions, but, in general, diesel fuels boil between an initial boiling point and a final boiling point. The initial boiling point is the lower end of the temperature range and it is at this temperature that some of the lighter compounds are vaporized. That is, when the diesel fuel temperature is below the initial boiling point, all of the diesel compounds will be in a liquid state. The final boiling point is the higher end of the temperature range and above this temperature all of the diesel compounds can be vaporized. When the temperature of the diesel fuel is between the initial and final boiling points, the fuel can be in two phases. For example, a common grade of diesel fuel is known as "No. 2 diesel fuel" and at atmospheric pressure this fuel has an initial boiling point of about 125° C. and a final boiling point of about 400° C. A distillation profile for No. 2 diesel fuel under atmospheric pressure is depicted in FIG. 7, with the boiling point for the different compounds plotted against percent (by weight). For example, with reference to this profile, a temperature of 350° C. is higher than the boiling point of over 90 percent of the compounds. In this example, if No. 2 diesel fuel is heated to 350° C., 90 percent of the fuel would be vaporized and only 10 percent of the fuel would remain in liquid form. At higher pressures, the profile shifts to higher temperatures, because the compounds will remain in a liquid state at higher temperatures when it is at higher pressure. Accordingly, the initial and final boiling points have values that change according to the current pressure of the pilot fuel.

Pilot fuel injection pressure can be higher than 20 MPa so all of the pilot fuel compounds held within the fuel injection valve can be superheated during engine operation and can remain in a liquid state at temperatures higher than 125° C. During engine operation the pilot fuel pressure within an injection valve is held at a substantially constant high pressure upstream from the valve seat so partial vaporization within the injection valve is not normally a problem. However, because the pilot fuel pressure fluctuates further below injection pressure, for example, downstream from the valve seat during an injection event, to prevent partial vaporization of the pilot fuel inside the nozzle orifices, it is desirable to keep the pilot fuel temperature inside the pilot fuel injection valve below the lower initial boiling point associated with the pilot fuel when it is downstream from the valve seat. With the low mass flow rate associated with pilot fuel or other super low flow applications, there can be a problem with keeping the pilot fuel temperature below the lower initial boiling points associated with lower pressures.

Partial vaporization of the fuel is undesirable because the heavier compounds which are harder to vaporize tend to be compounds that can form a sticky tar-like residue when the lighter compounds are vaporized. Accordingly, it is undesirable for the pilot fuel within the injection valve to be held at a temperature that will result in the pilot fuel being injected at a temperature that is between the initial and final boiling points for the pilot fuel when it is at a lower pressure downstream from the valve seat. At temperatures above 300° C. in some injection valves diesel fuel is known to start yielding precipitates including wax, varnish, and sulfur and under higher temperatures diesel fuel can turn to "coke" a solid residue of impure carbon that forms after the removal of volatile hydrocarbons by distillation.

Therefore, if a pilot fuel injection valve is operated with a pilot fuel temperature that is too high, a tar-like liquid mixture can form that is more likely to adhere to the valve surfaces downstream from the valve seat where the pilot fuel pressure is lower (and the initial boiling point is lower), and this can result in deposits which can eventually restrict fuel flow through the injection valve and/or interfere with valve operation. Even in areas where the diesel fuel velocity can be high, such as in the nozzle orifices, when the diesel fuel is partially vaporized tar-like compounds can be viscous enough to stick to the orifice walls.

When diesel fuel is employed as a pilot fuel, because the mass flow rate is much lower than when diesel is used as the main fuel, this can result in the temperature of the diesel fuel rising above the initial boiling point. Therefore, unlike conventional fuel injection valves, because of the lower mass flow rate for a pilot fuel versus a main fuel, with pilot fuel injection valves there can be a problem with keeping the temperature of the diesel fuel below the initial boiling point.

Another problem with gaseous-fuelled engines that employ a liquid pilot fuel is that combustion chamber deposits can collect on the surfaces of the fuel injection valve's nozzle that are exposed to the combustion chamber. For example, such deposits can form on the nozzle near the injection orifices and in the sac area of the gaseous and pilot fuel injection valves. Such deposits can form a layer that can grow in thickness and eventually interfere with the fuel flow through the orifices of the respective gaseous and pilot fuel injection valves. In some cases the nozzle orifices can be obscured to the degree that fuel flow into the combustion chamber is reduced, resulting in a drop in engine performance.

Pilot fuel and engine oil can both be sources of combustion chamber deposits. However improvements to modern engines have reduced engine oil consumption so that pilot fuel is believed to be the major contributor for combustion chamber deposits. Combustion chamber deposits can occur on both the gaseous and pilot fuel injection valves.

In a conventional direct injection engine, typically there is a heat transfer path from the injection valve nozzles, through the associated injection valve bodies, and to a liquid cooled cylinder head, within which the injection valves are mounted. This heat transfer path takes heat away from injection valve nozzles. In such an arrangement, the temperature of an injection valve nozzle can be between around 140° C. and 275° C. even when the peak temperature in the combustion chamber is at least 700° C. and the average temperature therein is at least about 425° C. This would not be a significant problem in an engine that is fuelled solely with gaseous fuel. However, when a liquid pilot fuel is used as the ignition assist mechanism, the relatively cool surface of the injection valve nozzle can cause the pilot fuel to condense thereon, if the surface temperature is lower than the final boiling point of the diesel fuel compounds. For a nozzle surface with a temperature that is between the initial and final boiling points, because the heavier tar-like compounds have higher boiling points, the condensate that will form on the exposed nozzle surfaces will comprises more of these sticky tar-like compounds. Over time, these deposits will decompose, losing hydrogen atoms and forming a hard carbon layer.

Accordingly, there is a need for a fuel injection system for a gaseous fueled engine with liquid pilot fuel ignition that avoids the problems that can arise if the heavier compounds of diesel fuel are deposited inside the pilot fuel injection valve or on the surfaces of the gaseous fuel or pilot fuel injection nozzles that can come into contact with the pilot fuel that is injected into the combustion chamber.

SUMMARY OF THE INVENTION

A fuel injection system and method of operation for a gaseous-fuelled internal combustion engine with liquid pilot fuel ignition comprises:
 (a) a pilot fuel injection valve mountable in a cylinder head of the engine and operable to inject a liquid pilot fuel directly into a combustion chamber of the engine, the pilot fuel injection valve comprising:
  a first valve body;
  a first nozzle associated with an end of the first valve body, wherein the first nozzle is positionable within the combustion chamber during a pilot fuel injection event so that the pilot fuel is introducible into the combustion chamber through the first nozzle;
  a pilot fuel cavity disposed within the injection valve body near the first nozzle;
  a first valve member movable within the first valve body to stop or allow pilot fuel flow from the pilot fuel cavity to the first nozzle;
  a pilot fuel supply passage disposed within the first valve body and communicating between a pilot fuel supply port and the pilot fuel cavity;
  a cooling system operable for cooling pilot fuel held within the pilot fuel injection valve to maintain a pilot fuel temperature below the initial boiling point of the pilot fuel when the engine is running; and
 (b) a gaseous fuel injection valve mountable in the engine and operable to inject a gaseous fuel into an intake port for the combustion chamber or directly into the combustion chamber, the gaseous fuel injection valve comprising:
  a second valve body;
  a second nozzle associated with an end of the second valve body, wherein the gaseous fuel is introducible through the second nozzle into the intake port or the combustion chamber during a gaseous fuel injection event;
  a gaseous fuel cavity disposed within the second valve body near the second nozzle;
  a second valve member movable within the second valve body to stop or allow gaseous fuel flow from the gaseous fuel cavity to the second nozzle;
  a gaseous fuel supply passage disposed within the second valve body and communicating between a gaseous fuel supply port and the gaseous fuel cavity;

wherein the first nozzle is thermally insulated from the first valve body so that surfaces of the first nozzle that can come into contact with vaporized pilot fuel that is injected into the combustion chamber can maintain a temperature that is not significantly below the final boiling point of the pilot fuel when the engine is running.

A surface temperature would be "significantly" below the final boiling point of the pilot fuel if it results in condensation of pilot fuel compounds and the formation of deposits that interfere with the operation or performance of the fuel injection valve. The surface temperature is not significantly below the final boiling temperature if only a thin layer of carbon deposits is formed that does not interfere with valve performance or operation. Because such a carbon layer has a low thermal f conductivity it provides additional insulation and at an equilibrium point the thickness of the carbon layer remains constant because the thermal insulation provided by the carbon layer in addition to the thermal insulation provided by the nozzle itself enables the surface to maintain a temperature that is higher than the final boiling point of the pilot fuel. However, it is more preferable for the nozzle to be thermally insulated so that the surface temperature is normally higher than the final boiling point without relying on additional insulating effects from carbon deposits so that deposits do not form thereon and engine performance is consistent from the first day the engine is broken in and for the remainder of the engine's service life.

In a preferred embodiment the gaseous fuel injection valve injects the gaseous fuel directly into the combustion chamber and the second nozzle is disposed within the combustion chamber. To prevent pilot fuel from condensing on the second nozzle when the engine is running, the second nozzle is thermally insulated from the second valve body so that surfaces of the second nozzle that can come into contact with pilot fuel inside the combustion chamber can maintain a temperature that is not significantly below the final boiling point of the pilot fuel.

An example of a thermal insulating feature for one or both of the first or second nozzles is a ceramic coating. A ceramic coating with a thermal conductivity that is less than or equal to about 5 W/mK can be employed to provide an insulating layer. One of both of the first or second nozzles can be made from a material with a thermal conductivity that is less than its respective valve body. Valve bodies are typically made from tool steel, which has a thermal conductivity of about 14 W/mK. For example, rather than applying a ceramic coating, the nozzle itself can be made from a ceramic material that has a lower thermal conductivity compared to tool steel.

The fuel injection system comprises a cooling system to keep the pilot fuel within the pilot fuel injection valve at a temperature that is lower than the initial boiling point. Upstream of the valve seat, the pilot fuel pressure is sufficiently high when the engine is running so that the pilot fuel can be superheated and there is little likelihood of the pilot fuel temperature exceeding the initial boiling temperature. However, it is desirable to keep the pilot fuel temperature much lower than the initial boiling point at this high pressure to prevent partial vaporization downstream of the valve seat, when the pilot fuel injection valve is opened because the pilot fuel pressure drops downstream from the valve seat (with a corresponding drop in the value of the initial boiling point). Therefore, in this context the initial boiling point is defined as the lowest initial boiling point that occurs within the pilot fuel injection valve, which occurs where the lowest pilot fuel pressures are found when the engine is running. The lowest pressures generally occur downstream of the valve seat, in the nozzle orifices and inside the sac volume. To accomplish the desired cooling, a drain passage leading from the pilot fuel cavity to a drain system can be employed to allow pilot fuel to flow through the valve body such that a portion of the pilot fuel can be circulated to act as a cooling fluid. A drain valve can be employed to control mass flow rate through the drain passage. The drain valve can be disposed within the valve body or in the drain system. In preferred embodiments the drain valve is operable to stop flow through the drain passage when cooling is not needed. This reduces parasitic losses and allows the pilot fuel pump to be sized for normal operating conditions instead of start-up or idle operating conditions. A preferred method of controlling the drain valve and mass flow rate through the drain passage employs a drain valve that opens when pilot fuel pressure within the pilot fuel cavity is higher than a predetermined pressure. A controller is operable to control pilot fuel pressure within the pilot fuel cavity so that the drain valve is closed when cooling inside the pilot fuel injection valve is not needed.

In another embodiment of the cooling system a coolant fluid is employed instead of the pilot fuel. At least one fluid passage is provided for circulating the coolant fluid near the pilot fuel cavity for cooling the pilot fuel therein.

The pilot fuel injection valve and the gaseous fuel injection valve can be integrated in a combined valve assembly. Such a combined valve assembly is mountable in a cylinder head of an internal combustion engine for injecting a gaseous fuel and a liquid pilot fuel directly into a combustion chamber of the engine. The combined valve assembly comprises:

(a) a pilot fuel injection valve comprising:
    a first valve body;
    a first nozzle associated with an end of the first valve body, wherein the first nozzle is positionable within the combustion chamber during a pilot fuel injection event so that the pilot fuel is introducible into the combustion chamber through the first nozzle;
    a pilot fuel cavity disposed within the injection valve body near the first nozzle;
    a first valve member movable within the first valve body to stop or allow pilot fuel flow from the pilot fuel cavity to the first nozzle;
    a pilot fuel supply passage disposed within the first valve body and communicating between a pilot fuel supply port and the pilot fuel cavity;
    a cooling system operable for cooling pilot fuel held within the pilot fuel injection valve to maintain a pilot fuel temperature below the initial boiling point of the pilot fuel when the engine is running; and (b) a gaseous fuel injection valve comprising:
    a second valve body;
    a second nozzle associated with an end of the second valve body, wherein the gaseous fuel is introducible through the second nozzle into the intake port or the combustion chamber during a gaseous fuel injection event;
    a gaseous fuel cavity disposed within the second valve body near the second nozzle;
    a second valve member movable within the second valve body to stop or allow gaseous fuel flow from the gaseous fuel cavity to the second nozzle;
    a gaseous fuel supply passage disposed within the second valve body and communicating between a gaseous fuel supply port and the gaseous fuel cavity;

wherein the first and second nozzles are each thermally insulated from the respective first and second valve bodies so that surfaces of the first and second nozzles that can come into contact with vaporized pilot fuel within the combustion chamber can maintain a temperature that is not significantly below the final boiling point of the pilot fuel when the engine is running.

In a preferred arrangement, the pilot fuel injection valve and the gaseous fuel injection valve are concentric with the first valve body disposed within the second valve body. The first valve body is movable within the second valve body and also functions as the second valve member.

The combined valve assembly can employ a ceramic coating on the surfaces of the first and second nozzles to provide a thermally insulating layer so that the nozzle surfaces that can come into contact with pilot fuel inside the combustion chamber can retain heat so that the surface temperature can be near or higher than the final boiling point of the pilot fuel. The ceramic coating preferably has a thermal conductivity that is less than or equal to about 5 W/mK and materials with lower thermal conductivity can reduce the thickness of the coating that is needed to provide the desired thermal barrier to keep the pilot fuel inside the injection valve cool, and the outer surface of the nozzle hot.

In a combined valve assembly one or both of the first and second nozzles can be made from a material with a thermal conductivity that is less than or equal to about 10 W/mK. When the nozzle is made from a thermally insulating material, the nozzle can have a higher thermal conductivity than a coating with equivalent insulating properties because the nozzle is thicker. A lower thermal conductivity is preferred because, using the pilot fuel injection valve as an example, the pilot fuel nozzle acts as a thermal barrier between the pilot fuel cavity where it is cooled to a temperature lower than the initial boiling point to keep the pilot fuel in a liquid state, and the nozzle's outer surface where it is desirable to maintain a temperature higher than the final boiling point of the pilot fuel. With No. 2 diesel fuel as an example, the difference between the initial boiling point at 125° C. and the final boiling point at 400° C., is 275° C. Accordingly, to maintain a temperature differential of at least 275° C., a coating material or nozzle body material with a lower thermal conductivity is preferred. By way of example, ceramic materials can be made with the requisite low thermal conductivity.

A pilot fuel injection valve injects a liquid pilot fuel directly into a combustion chamber of an internal combustion engine that consumes a gaseous fuel as its main fuel. The gaseous fuel can be injected directly into the combustion chamber or into the intake port so that it forms a pre-mixed charge of fuel and air, which is introduced into the combustion chamber through the intake valve. The pilot fuel injection valve comprises:
  a valve body;
  a nozzle associated with an end of the valve body, wherein the nozzle is positionable within the combustion chamber during a pilot fuel injection event so that the pilot fuel is introducible into the combustion chamber through the nozzle;
  a pilot fuel cavity disposed within the valve body near the nozzle;
  a valve member movable within the valve body to stop or allow pilot fuel flow from the pilot fuel cavity to the nozzle;
  a pilot fuel supply passage disposed within the injection valve body and communicating between a pilot fuel supply port and the pilot fuel cavity;
  a cooling system operable for cooling pilot fuel held within the fuel injection valve to maintain a pilot fuel temperature below the initial boiling point of the pilot fuel when the engine is running;

wherein the nozzle is thermally insulated from the rest of the valve body so that surfaces of the nozzle that face the combustion chamber can maintain a temperature that is not significantly below the final boiling point of the pilot fuel when the engine is running.

Carbon deposits are not normally a problem encountered by gaseous fuel injection valves, which are normally port injection valves for introducing the gaseous fuel into an intake port. In such arrangements, even if a liquid pilot fuel is employed, the pilot fuel is typically injected into the combustion chamber so the port mounted gaseous fuel injection valve is not exposed to pilot fuel. However, a gaseous fuel injection valve is susceptible to carbon deposits if it is employed for injecting a gaseous fuel directly into a combustion chamber of an internal combustion engine that employs a liquid pilot fuel to assist with ignition of the gaseous fuel. A gaseous fuel injection valve comprises:
  a valve body;
  a gaseous fuel nozzle associated with an end of the valve body, wherein the gaseous fuel nozzle is positionable within the combustion chamber during a gaseous fuel injection event so that the gaseous fuel is introducible into the combustion chamber through the gaseous fuel nozzle;
  a gaseous fuel cavity disposed within the injection valve body near the gaseous fuel nozzle;
  a gaseous fuel valve member movable within the valve body to stop or allow gaseous fuel flow from the gaseous fuel cavity to the nozzle;
  a gaseous fuel supply passage disposed within the injection valve body and communicating between a gaseous fuel supply port and the gaseous fuel cavity;

wherein the gaseous fuel nozzle is thermally insulated from the rest of the valve body so that surfaces of the nozzle that face the combustion chamber can maintain a temperature that is not significantly below the final boiling point of the pilot fuel when the engine is running.

A method of operating a gaseous-fuelled internal combustion engine with liquid pilot fuel ignition comprises:
  injecting a liquid pilot fuel directly into a combustion chamber through a nozzle of a pilot fuel injection valve that is mounted in a cylinder head of the engine with the nozzle protruding into the combustion chamber;
  cooling the liquid pilot fuel within the pilot fuel injection valve to maintain a pilot fuel temperature therein that is lower than the initial boiling point of the liquid pilot fuel;
  thermally insulating the nozzle so that surfaces that can come into contact with pilot fuel within the combustion chamber can maintain a surface temperature higher than the final boiling point of the liquid pilot fuel; and
  introducing a gaseous fuel into the combustion chamber.

In a preferred method the gaseous fuel is introduced into the combustion chamber by injecting the gaseous fuel directly into the combustion chamber through a gaseous fuel nozzle that is mounted in the cylinder head with the gaseous fuel nozzle protruding into the combustion chamber. The method further comprises thermally insulating the gaseous fuel nozzle so that surfaces that can come into contact with pilot fuel inside the combustion chamber can maintain a surface temperature that is not significantly lower than the final boiling point of the liquid pilot fuel. Preferably, the nozzle can absorb and retain heat from the combustion process to maintain a surface temperature that is higher than the final boiling point of the liquid pilot fuel so that pilot fuel does not condense thereon.

The engine's cylinder head is typically cooled by directing a liquid coolant through passages provided inside the cylinder head. The cooling effect of the cylinder head and the liquid pilot fuel flowing through the injection valve both act to cool the nozzle surface. As disclosed herein, to prevent condensation of the pilot fuel on the nozzle surface, the nozzle can be thermally insulated so that it can maintain a surface temperature that is higher than the final boiling point of the pilot fuel. Diesel fuel has been used as an example herein, but those skilled in the technology will understand that less insulation can be employed if a pilot fuel with a lower final boiling temperature is employed instead of diesel fuel because the surface temperature could be maintained at a lower temperature and still be above the final boiling point of the selected pilot fuel. For example, if the temperature of the cylinder head's firedeck is about 200° C. and the fuel injection nozzles are also maintained at about this temperature, a pilot fuel with a final boiling point less than 200° C. would not condense on the nozzle surfaces. By way of example, kerosene and some fuels formulated for jet engines have lower final boiling points compared to diesel fuels.

BRIEF DESCRIPTION OF THE DRAWINGS

The drawings illustrate specific preferred embodiments of the invention, but should not be considered as restricting the spirit or scope of the invention in any way.

FIG. 3B shows the spring clip member wrapped around the valve needle with the closed position shown.

DETAILED DESCRIPTION OF THE PREFERRED EMBODIMENT(S)

A number of preferred embodiments are provided of fuel injection valves that can be employed in a fuel injection system for a gaseous-fuelled internal combustion engine that employs a liquid pilot fuel. The figures illustrate the nozzle end of a pilot fuel injection valve with cooling features to keep the liquid pilot fuel within the valve body cooler than the lowest initial boiling temperature of the pilot fuel that occurs within the pilot fuel injection valve. Also provided are thermal insulation features for reducing the cooling influence of the cylinder head and the liquid pilot fuel on the nozzle's outer surface. To prevent a significant amount of pilot fuel from condensing on the nozzle's outer surface, the nozzle's outer surface is thermally insulated to prevent the surface temperature from dropping significantly below the final boiling point of the liquid pilot fuel when the engine is running. In preferred embodiments the heat of combustion generated by the running engine is sufficient to maintain the outer nozzle's outer surface at a temperature that is higher than the final boiling point of the liquid pilot fuel.

The cooling features of the illustrated preferred embodiments are drain passages for allowing a portion of the liquid pilot fuel to circulate and be vented to a drain system to provide cooling inside the valve body. These cooling features are also disclosed in co-owned published Canadian Patent Application No. 2,405,350. In these preferred embodiments, the timing for cooling can be controlled by controlling fuel pressure within the fuel cavity whereby a drain valve remains closed when fuel pressure is less than a predetermined set point. That is, the drain valve opens when fuel pressure within the fuel cavity is greater than the predetermined set point. In another embodiment (not shown) separate cooling fluid passages can be employed to circulate a coolant other than the liquid pilot fuel to keep the temperature of the liquid pilot fuel below its initial boiling point. For example, the engine coolant could be circulated through separate cooling fluid passages to provide cooling inside the pilot fuel injection valve.

Figure 1:
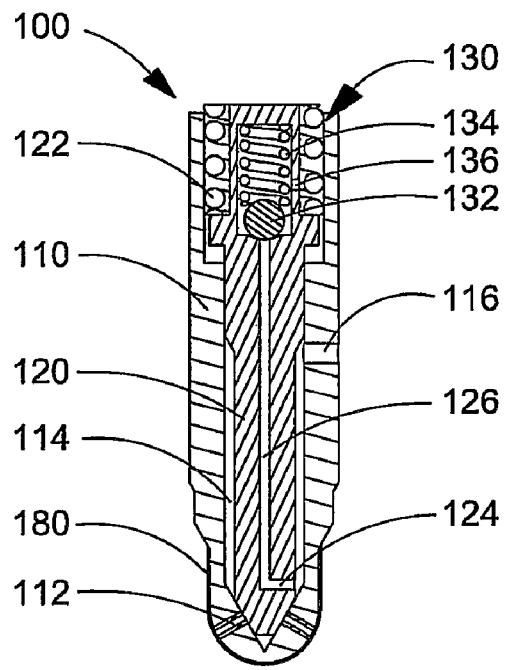
FIG. 1 illustrates a partial section view of the nozzle end of a pilot fuel injection valve that comprises a drain passage for allowing a pilot fuel to circulate through a fuel cavity located therein. A drain valve positioned within the valve body permits one-way flow from the fuel cavity when fuel pressure therein is great enough to overcome the spring that biases the valve in a closed position. A thermally insulating coating is applied to the nozzle surfaces that are exposed to the combustion chamber to prevent that surface from being cooled to a temperature significantly below the final boiling point of the pilot fuel when the engine is running. Ideally the thermal insulation is sufficient to keep the nozzle's outer surface at a temperature that is higher than the final boiling point of the pilot fuel when the engine is running.

With reference to the embodiment of FIG. 1, only the nozzle end of pilot fuel injection valve 100 is shown. Pilot fuel injection valve 100 comprises valve body 110, movable needle 120 and drain valve assembly 130. Valve body 110 has pilot fuel nozzle orifices 112 through which pilot fuel may be injected into a combustion chamber of a gaseous-fuelled internal combustion engine. Coating 180 provides thermal insulation to the nozzle's outer surfaces that are exposed to the combustion chamber when pilot fuel injection valve 100 is mounted in the cylinder head of an engine.

Ceramic materials are an example of a preferred material for coating 180 to provide a thermally insulating layer to reduce the cooling effects of the cylinder head and the cooling systems provided within the pilot fuel injection valve itself. A typical material for the valve body 110 is tool steel, which has a thermal conductivity of about 14 W/mK, whereas ceramic materials can be made with much a lower thermal conductivity. More preferably, the insulating coating has a thermal conductivity that is less than 1 W/mK and the coating has a thickness less than 1 millimeter.

The pilot fuel injection valve of FIG. 1 is shown in the closed position. That is, needle 120 is shown seated against a sealing surface of valve body 110. When needle 120 is seated it cooperates with valve body 110 to establish a boundary that prevents pilot fuel from flowing from annular fuel cavity 114 to nozzle orifices 112. Needle 120 is biased in the closed position by needle spring 122. Conventional actuators may be employed to move needle 120 to an open position, wherein needle 120 is lifted away from the sealing surface of injection valve body 110. For example, using a typical hydraulic actuation arrangement (not shown), hydraulic pressure is employed in addition to needle spring 122 to hold needle 120 in the closed position. When the hydraulic pressure is relieved, fuel pressure within pilot fuel cavity 114 overcomes the closing force of needle spring 122 and needle 120 moves to an open position and pilot fuel is injected into a combustion chamber through nozzle orifices 112.

In the illustrated embodiment, pilot fuel cavity 114 is provided by an annular space between needle 120 and the walls of a bore provided within valve body 110. Liquid pilot fuel is supplied to pilot fuel cavity 114 through pilot fuel inlet port 116. In this embodiment, liquid pilot fuel is supplied to inlet port 116 at injection pressure, from a high-pressure common rail fuel supply system.

Pilot fuel supplied to pilot fuel cavity 114 also flows through port opening 124 into drain passage 126, which is a longitudinal bore provided inside needle 120.

When pilot fuel pressure within pilot fuel cavity 114 and drain passage 126 is greater than a predetermined set point, drain valve member 132 lifts away from its closed position (shown in FIG. 1). In the embodiment illustrated in FIG. 1, drain valve member 132 is in the shape of a ball. Those skilled in the art will understand that other shapes for the drain valve member may be employed without departing from the spirit of this disclosure. For example, another element, such as a needle, that is movable from a closed seated position to an open position, spaced apart from a valve seat, may be substituted instead of a ball. Drain valve spring 134 biases drain valve member 132 in the closed position. Accordingly, drain valve spring 134 is selected to provide the closing force necessary to hold drain valve member 132 in the closed position until the set point pressure is exceeded. When drain valve assembly 130 is open, a portion of the pilot fuel supplied to pilot fuel cavity 114 flows through drain passage 126 and drain port 136 and into a drain system which returns pilot fuel to the pilot fuel supply system.

When an engine is starting up, before mechanical power from the engine is available to drive engine systems, electrical power is normally used to "crank" the engine and drive the engine systems necessary for engine start up, including the pilot fuel pump. Crank speed during start up is typically much lower than crankshaft speed during normal operation, so a cooling system that allows pilot fuel to flow to drain during start up requires a larger pump to provide higher pilot fuel flow rates at low speed. However, it is undesirable to size the pilot fuel pump based upon start up requirements because during normal operation, which represents the majority of engine operation, the pilot fuel pump can be driven at higher speeds, and a pilot fuel pump sized to provide higher flow rates for cooling during start up would be greatly oversized for normal operation. Another concern is conserving power during start up conditions. Reducing electrical power demands is especially important when electrical power is supplied from a battery, because if power demands are higher a larger battery is needed and the higher power demands may result in too much power being drained from the battery if the engine does not start immediately, causing damage to the battery and/or causing the engine to not start.

The set point for opening drain valve assembly 130 is chosen so that it is normally closed during start up conditions. During start up, pilot fuel pressure within pilot fuel cavity 114 is initially lower than the normal pilot fuel pressure during post-start up conditions. By not draining pilot fuel during start up, a smaller pilot fuel pump may be employed, a parasitic load is eliminated, and pilot fuel pressure within pilot fuel cavity 114 can increase more rapidly, compared to a pilot fuel injection valve that drains a portion of the pilot fuel from its pilot fuel cavity continuously.

Advantageously, compared to post-start up conditions, the temperature within the injection valve is normally lower during start up, so cooling of the injection valve is not normally needed at this time.

After start up, mechanical power from the engine is available to drive engine systems, including the pilot fuel pump, which is then typically driven at much higher speeds, and the parasitic load for draining a portion of the pilot fuel from pilot fuel cavity 114 is not significant. In addition, port opening 124 or drain passage 126 is preferably sized to provide a limit on the parasitic load by restricting the mass flow rate of pilot fuel that is drained from pilot fuel cavity 114 through drain passage 126.

In FIGS. 2 through 5, features that are substantially the same as the equivalent features of FIG. 1 are identified by like reference numbers or reference numbers increased by increments of 100. If equivalent features function in substantially the same way, a description of their function may not be repeated.

Figure 2:
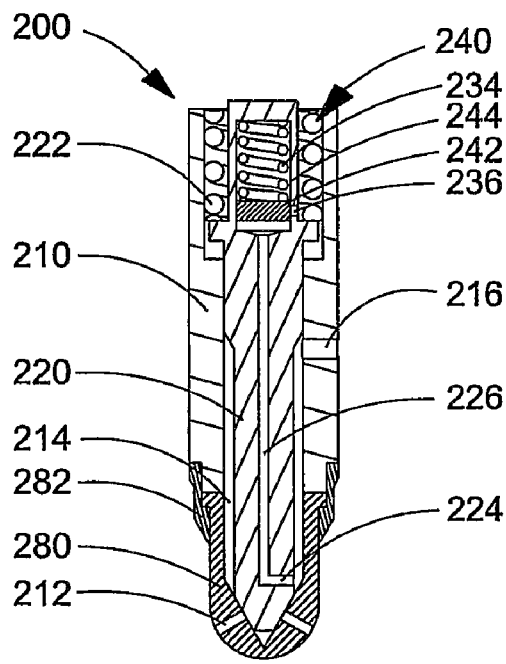
FIG. 2 illustrates a partial section view of another embodiment of a fuel injection valve that comprises a drain passage from the fuel cavity located near the nozzle of the injection valve. This embodiment is similar to the embodiment of FIG. 1 but with a different type of drain valve. The drain valve of this embodiment employs a spring biased shuttle member that permits fuel to flow from the fuel cavity when fuel pressure therein is great enough to overcome the spring that biases the shuttle member in a closed position where it covers a drain port. In this embodiment the nozzle is made from a different material from the valve body such that the entire nozzle acts as a thermal insulator to insulate the outer surface from being cooled to a temperature that is significantly lower than the final boiling point of the pilot fuel.

FIG. 2 illustrates another preferred embodiment of a liquid pilot fuel injection valve that can be employed with a gaseous-fuelled internal combustion engine. Fuel injection valve 200 comprises injection valve body 210 (with only the nozzle end area of the injection valve shown in FIG. 2), movable needle 220 and drain valve assembly 240. Nozzle orifices 212 are provided near the end of the nozzle and needle spring 222 helps to bias needle 220 in the closed position. An annular space between valve body 210 and needle 220 defines pilot fuel cavity 214. Pilot fuel may be supplied to pilot fuel cavity 214 through pilot fuel inlet port 216, and drained from therefrom through port opening 224, drain passage 226, and drain port 236.

In the preferred embodiment shown in FIG. 2, nozzle 280 is made from a material that has a lower thermal conductivity than valve body 210, which is made from tool steel. For example, nozzle 280 can be made from a ceramic material with a thermal conductivity that is less than 10 W/mK. By way of example, nozzle 280 is attached to valve body 210, by retaining ring 282.

Drain valve assembly 240 controls the flow of fuel from pilot fuel cavity 214 to drain. Compared to the cooling system of FIG. 1, the embodiment of FIG. 2 employs a different type of drain valve assembly. Drain valve assembly 240 is in substantially the same location as drain valve assembly 130 of FIG. 1, and drain valve spring 234 functions in substantially the same way as drain valve spring 134.

However, drain valve member 242 is a shuttle member that is movable in the direction of the longitudinal axis of fuel injection valve 200. To reduce leakage, the sides of drain valve member 242 that face valve chamber side wall 244 and side wall 244 are preferably a close fit. When drain valve assembly 240 is closed, valve member 242 covers drain port 236 to block pilot fuel from flowing to drain. Drain valve assembly 240 is open when pilot fuel pressure within pilot fuel cavity 214 and drain passage 226 is sufficient to push drain valve member 242 against drain valve spring 234 so that it no longer blocks fuel from flowing through drain port 236.

Figure 3A:
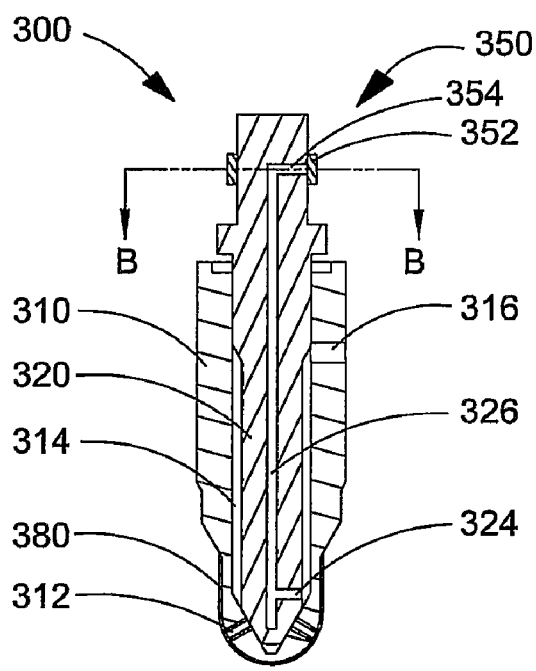
FIG. 3A illustrates a partial section view of another embodiment of a fuel injection valve that is like the embodiment of FIG. 1 except that the drain valve employs a spring clip member that covers a drain orifice when the fuel pressure within the fuel cavity is low. The spring clip member lifts away from the drain orifice opening when fuel pressure within the fuel cavity exceeds a predetermined set point. Also like the embodiment of FIG. 1, the embodiment illustrated in FIG. 3A employs a thermally insulating coating that is applied to the nozzle surfaces that are exposed to the combustion chamber to prevent the coated surface from being cooled by the cylinder head and the fluid inside the injection valve to a temperature significantly below the final boiling of the pilot fuel when the engine is running.
Figure 3B:
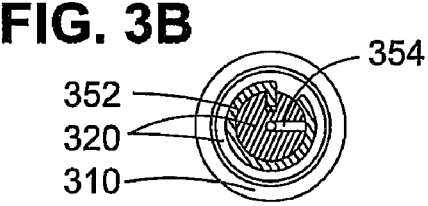
FIG. 3B is a section view through the valve needle at the section indicated in FIG. 3A.
Figure 3C:
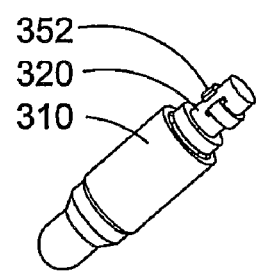
FIG. 3C illustrates a perspective view of a portion of a valve needle with a spring clip member and drain orifice.

FIGS. 3A, 3B and 3C illustrate yet another preferred embodiment of a pilot fuel injection valve. In this embodiment, the means for thermally insulating the nozzle is coating 380, like coating 180 of FIG. 1, but a different arrangement is employed for the cooling system. Pilot fuel injection valve 300 comprises valve body 310 (with only the nozzle end portion shown in the Figures), movable needle 320 and drain valve assembly 350. Nozzle orifices 312 are provided near the end of the nozzle. An annular space between valve body 310 and needle 320 defines pilot fuel cavity 314. Pilot fuel may be supplied to pilot fuel cavity 314 through pilot fuel inlet port 316, and drained from therefrom through port opening 324, drain passage 326.

Drain valve assembly 350 controls the flow of pilot fuel from pilot fuel cavity 314 to drain. In the embodiment of FIG. 3, drain valve assembly 350 comprises spring clip member 352 which is wrapped around needle 320, as best shown in the end section view of FIG. 3B and the perspective view of FIG. 3C. One end of spring clip member 352 is fixedly associated with needle 320, for example, by inserting an end into a groove provided in the surface of needle 320. The other end of spring clip member 352 is free, but is urged against needle 320 by the spring force of the spring clip member itself. However, when pressure within pilot fuel cavity 314 is greater than a predetermined set point, the pilot fuel pressure provides an opening force that lifts the free end of spring clip member 352 away from needle 320, so that pilot fuel may flow through drain port 354 and into a drain system for returning the pilot fuel to the pilot fuel supply system.

Figure 4:
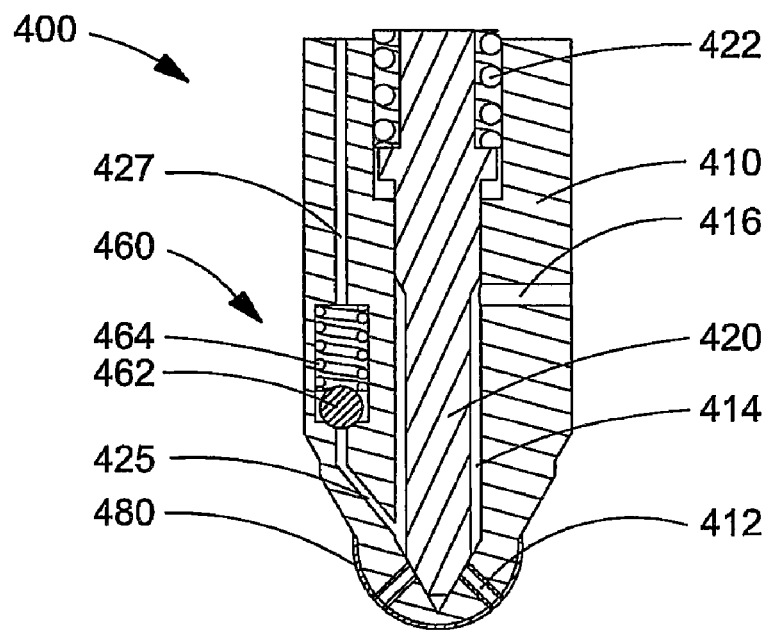
FIG. 4 illustrates a partial section view of another embodiment of a fuel injection valve that comprises a drain passage for draining fuel from the fuel cavity. In this embodiment, the drain passage and the drain valve are both disposed within the injection valve body. In this embodiment the nozzle is coated with a thermally insulating coating.

FIG. 4 illustrates yet another preferred embodiment of a pilot fuel injection valve. Like previously described embodiments of FIGS. 1 and 3A, coating 480 provides a thermally insulating layer that allows the nozzle surface to stay hot while the temperature of the pilot fuel held in the pilot fuel cavity preferably remains lower than the initial boiling point. Pilot fuel injection valve 400 comprises injection valve body 410 (with only the nozzle end shown in FIG. 4), movable needle 420 and drain valve assembly 460. Nozzle orifices 412 are provided near the end of the nozzle and needle spring 422 helps to bias needle 420 in the closed position. An annular space between valve body 410 and needle 420 defines fuel cavity 414. Pilot fuel may be supplied to pilot fuel cavity 414 through pilot fuel inlet port 416. A difference between the embodiment of FIG. 4 and the embodiments described above is that the drain passages and drain valve assembly are provided within valve body 410 instead of within needle 420.

When pilot fuel pressure within fuel cavity 414 is greater than a predetermined set point, drain valve member 462 is lifted from its seated closed position against the bias of drain valve spring 464 and pilot fuel is drained from pilot fuel cavity 414 through drain passage 425, and drain port 427.

Figure 5:
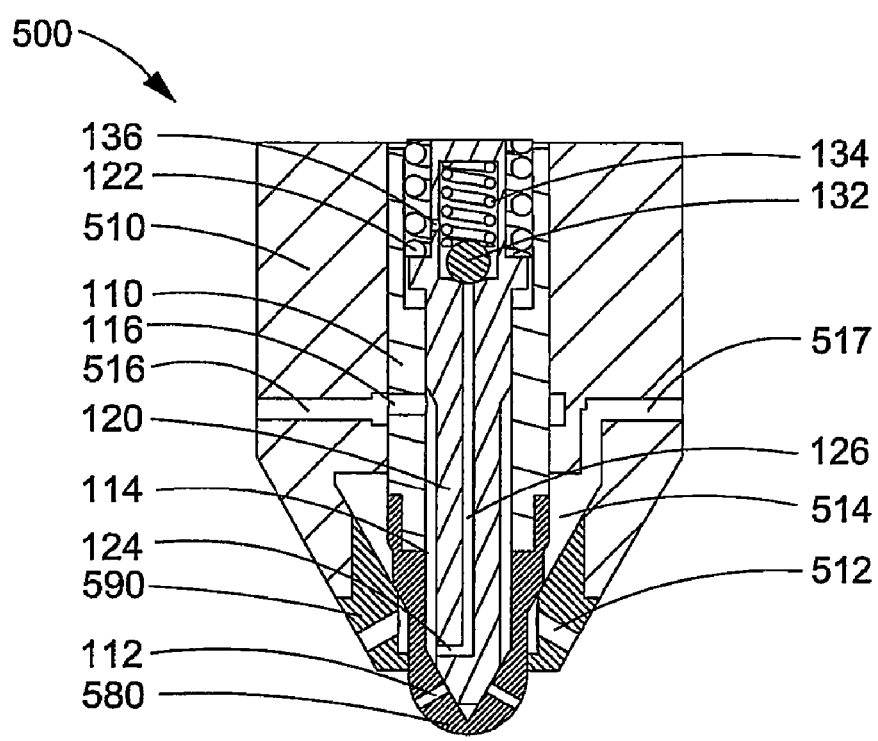
FIG. 5 illustrates a partial section view of an embodiment of the liquid cooled fuel injection valve, which is a component of a combined valve assembly for independently and separately injecting fuel into a combustion chamber through two different sets of nozzle orifices. The fuel injected through each set of nozzle orifices may be different fuels or the same fuel. A drain passage is provided to allow pilot fuel to circulate and thereby cool the fuel held within the pilot fuel cavity. The embodiment of FIG. 5 employs nozzles made from a material that has a lower thermal conductivity than the valve bodies, which are typically made from tool steel.

With reference to FIG. 5, combined valve assembly 500 comprises an inner valve assembly that is essentially the same as pilot fuel injection valve 100. Like features are identified by like reference numbers. The main difference with the embodiment of FIG. 5 is that the pilot fuel injection valve is a component of combined fuel injection valve assembly 500 that is operable to independently and separately inject fuel directly into a combustion chamber through two sets of nozzle orifices. The fuel injected through each set of nozzle orifices may be different fuels or the same fuel, with the fuel injected through the inner valve being a pilot fuel or a valve that is employed to inject smaller doses of fuel into the combustion chamber. In the illustrated arrangement, inner valve body 110 also serves as the movable needle member for an outer valve assembly. Other embodiments (not shown) can employ a stationary inner valve body and a movable annular sleeve around the stationary inner valve body to act as the valve member for opening and closing the outer valve.

Inner valve body 110 is attached to nozzle 580, which is made from a material with a much lower thermal conductivity than that of inner valve body 110. Similarly, outer valve body 510 is attached to nozzle 590, which is likewise made from a material with a much lower thermal conductivity than that of outer valve body 510. The material for nozzles 580 and 590 are selected to provide enough thermal insulation to allow the outer surfaces and the orifice openings which are exposed to the combustion chamber to absorb and retain heat from the combustion process to maintain a surface temperature during engine operation that is near or higher than the final boiling point of the pilot fuel. The surface temperature of nozzles 580 and 590 is more preferably higher than the final boiling point because this prevents the pilot fuel from condensing on the nozzle surfaces and the growth of any carbon deposits on these surfaces. However, a temperature slightly below the final boiling point can also be effective if it limits the thickness of the carbon deposits that can form on the nozzle surfaces. A carbon layer has a thermal conductivity of between 0.17 and 0.8 W/mK, so if the thermally insulated nozzle limits the carbon layer thickness to a level that does not interfere with valve operation, a thin carbon layer can actually provide additional thermal insulation. The thermally insulated nozzle and the carbon deposits can collectively provide the thermal insulation needed to keep the surface temperature above the final boiling point when the engine is running, to prevent further carbon deposits that might interfere with valve operation and engine performance.

In the preferred application, the inner valve is employed to inject a liquid pilot fuel and the outer valve is employed to inject a gaseous fuel. Outer valve orifices 512 provide a means for injecting the gaseous fuel into the combustion chamber from gaseous fuel cavity 514 when inner fuel injection valve body 110 is lifted away from the sealing surfaces of outer body 510.

During operation, liquid fuel is supplied to liquid fuel inlet port 116 through liquid fuel supply conduit 516, and gaseous fuel is supplied to gaseous fuel cavity 514 through gaseous fuel supply conduit 517.

The embodiment of FIG. 5 may also be employed to inject the same fuel through both sets of nozzle orifices. This arrangement can be utilized to provide accurate fuel metering over a broader range of fueling levels. For example, the inner liquid cooled fuel injection valve may be used when it is desirable to have improved control over fuel metering at idling or low loads, when smaller quantities of fuel are needed, and the outer valve assembly may be used at higher loads when larger quantities of fuel are needed. In this example, the same problems found in a gaseous fuelled engine can occur because the mass flow rate of the fuel injected through the inner valve can be equally small, and if a larger quantity of fuel is being injected, the liquid fuel can reside in the inner fuel cavity over a prolonged period of time, making a circulation flow important for providing cooling within the inner valve assembly.

Figure 6:
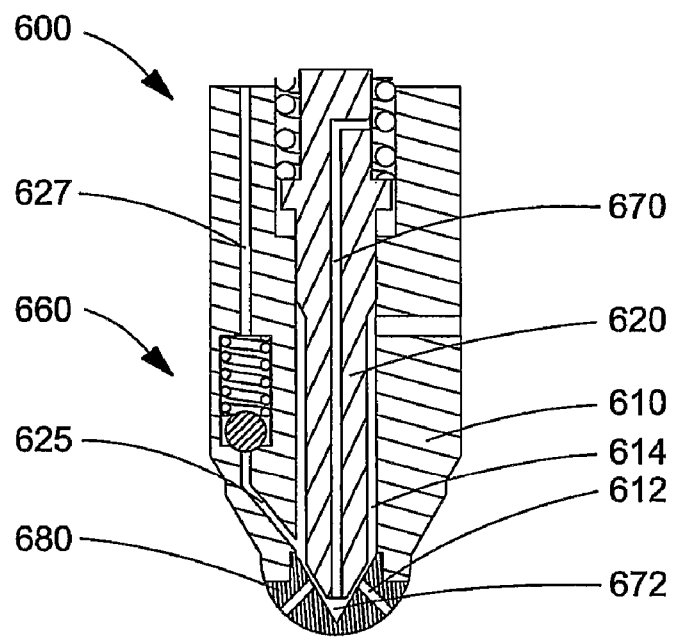
FIG. 6 illustrates a partial section view of an embodiment of the liquid cooled fuel injection valve, which combines the feature of a drain passage and drain valve assembly, with a spill port for shaping that rate of fuel injection into a combustion chamber. In this embodiment the nozzle is made from a different material than that of the valve body wherein the nozzle has a lower thermal conductivity than the valve body.
Figure 7:
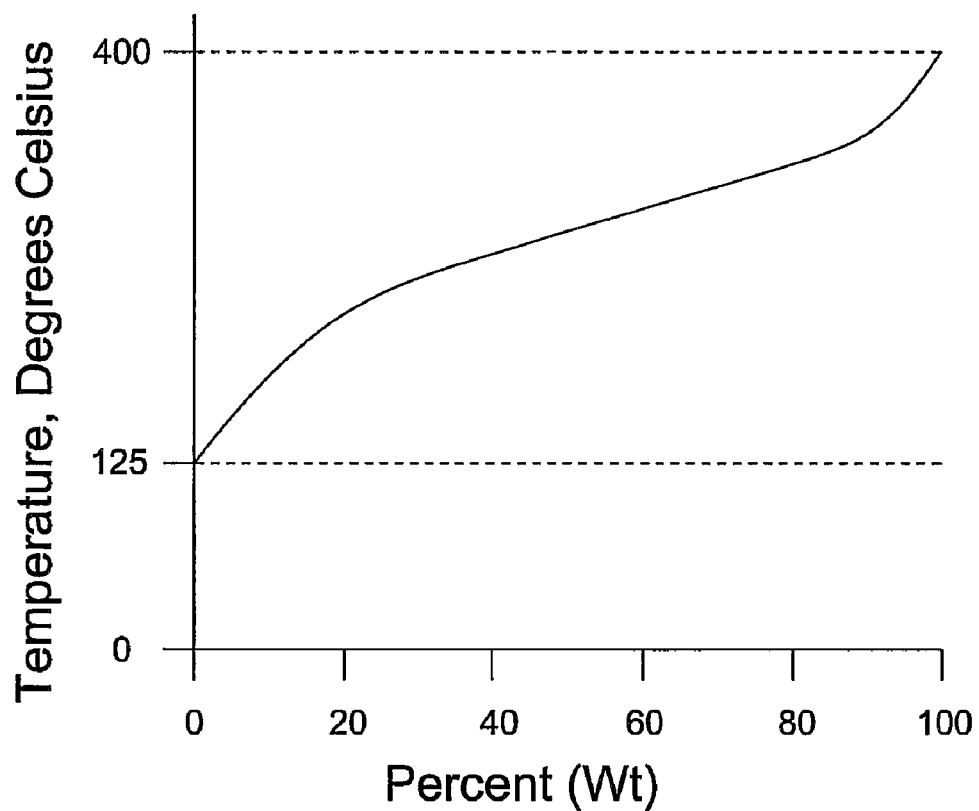
FIG. 7 is a distillation profile for No. 2 diesel fuel, which has a distillation profile with characteristics that are typical for diesel fuels.

With reference to FIG. 6, nozzle 680 is made from a material with a low thermal conductivity to provide thermal insulation between the nozzle surface and pilot fuel cavity 614. In this embodiment, in addition to drain passage 625, drain port 627, and drain valve assembly 660, liquid cooled fuel injection valve 600 further comprises spill port 670, which is isolated from fuel cavity 614 when valve member 620 is seated against a sealing surface of injection valve body 610. Spill port 670 may be employed to shape the rate of fuel injection during an injection event as described in U.S. Pat. No. 5,765,755. Spill port 670 extends between sac volume 672 and drain passages within fuel injection valve 600. In the illustrated arrangement, spill port 670 allows additional fuel flow into the drain system during an injection event.

Valve member 620 may cooperate with a second seat between sac volume 672 and nozzle orifice 612 to prevent compressed air and combustion products from entering the drain system when the fuel injection valve is closed.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A fuel injection system for a gaseous fuelled internal combustion engine with. liquid pilot fuel ignition, said system comprising:
    (a) a pilot fuel injection valve mountable in a cylinder head of said engine and operable to inject a liquid pilot fuel directly into a combustion chamber of said engine, said pilot fuel injection valve comprising:
    a first valve body;
    a first nozzle associated with an end of said first valve body, wherein said first nozzle is positionable within said combustion chamber during a pilot fuel injection event so that said pilot fuel is introducible into said combustion chamber through said first nozzle;
    a pilot fuel cavity disposed within said first valve body near said first nozzle;
    a first valve member movable within said first valve body to stop or allow pilot fuel flow from said pilot fuel cavity to said first nozzle;
    a pilot fuel supply passage disposed within said first valve body and communicating between a pilot fuel supply port and said pilot fuel cavity;
    a cooling system operable for cooling pilot fuel held within said pilot fuel injection valve to maintain a pilot fuel temperature below the initial boiling point of said pilot fuel when said engine is running; and
    (b) a gaseous fuel injection valve mountable in said engine and operable to inject a gaseous fuel into an intake port for said combustion chamber or directly into said combustion chamber, said gaseous fuel injection valve comprising:
    a second valve body;
    a second nozzle associated with an end of said second valve body, wherein said gaseous fuel is introducible through said second nozzle into said intake port or directly into said combustion chamber during a gaseous fuel injection event;
    a gaseous fuel cavity disposed within said second valve body near said second nozzle;
    a second valve member movable within said second valve body to stop or allow gaseous fuel flow from said gaseous fuel cavity to said second nozzle;
    a gaseous fuel supply passage disposed within said second valve body and communicating between a gaseous fuel supply port and said gaseous fuel cavity;
    wherein said pilot fuel injection valve and said gaseous fuel injection valve cooperate together to fuel the internal combustion engine and said first nozzle is thermally insulated from said first valve body so that surfaces of said first nozzle that can come into contact with vaporized pilot fuel that is injected into said combustion chamber can maintain a temperature that is higher than the final boiling point of said pilot fuel when said engine is running.

2. The fuel injection system of claim 1 wherein said first nozzle comprises a ceramic coating.

3. The fuel injection system of claim 2 wherein said ceramic coating has a thermal conductivity that is less than or equal to about 10 W/mK.

4. The fuel injection system of claim 1 wherein said gaseous fuel injection valve injects said gaseous fuel directly into said combustion chamber and said second nozzle is disposed within said combustion chamber, and said second nozzle is thermally insulated from said second valve body so that surfaces of said second nozzle that can come into contact with vaporized pilot fuel that is injected into said combustion chamber can maintain a temperature that is higher than the final boiling point of said pilot fuel when said engine is running.

5. The fuel injection system of claim 4 wherein said first nozzle comprises a ceramic coating.

6. The fuel injection system of claim 5 wherein said ceramic coating has a thermal conductivity that is less than or equal to about 10 W/mK.

7. The fuel injection system of claim 4 wherein said first and second nozzles each further comprises a ceramic coating with a thermal conductivity that is less than or equal to about 10 W/mK.

8. The fuel injection system of claim 1 wherein said first nozzle is made from a first material and said first valve body is made from a second material and said first material has a lower thermal conductivity than said second material.

9. The fuel injection system of claim 8 wherein said first material is ceramic.

10. The fuel injection system of claim 8 wherein said second material is tool steel.

11. The fuel injection system of claim 4 wherein said first nozzle is made from a first material and said first valve body is made from a second material and said first material has a lower thermal conductivity than said second material.

12. The fuel injection system of claim 11 wherein said first material is ceramic.

13. The fuel injection system of claim 11 wherein said second material is tool steel.

14. The fuel injection system of claim 4 wherein said first and second nozzles are each made from a material with a lower thermal conductivity than their respective first and second valve bodies.

15. The fuel injection system of claim 14 wherein said first and second valve bodies are made from tool steel.

16. The fuel injection system of claim 14 wherein said first and second nozzles are each made from a ceramic material.

17. The fuel injection system of claim 1 wherein said cooling system comprises a drain passage leading from said pilot fuel cavity to a drain system so that pilot fuel can flow through said valve body.

18. The fuel injection system of claim 17 wherein said cooling system further comprises a drain valve for controlling mass flow rate through said drain passage.

19. The fuel injection system of claim 18 wherein said drain valve is disposed within said valve body.

20. The fuel injection system of claim 18 wherein said drain valve is operable to stop flow through said drain passage when cooling is not needed.

21. The fuel injection system of claim 18 wherein said drain valve opens when pilot fuel pressure within said pilot fuel cavity is higher than a predetermined pressure and a controller is operable to control pilot fuel pressure within said pilot fuel cavity.

22. The fuel injection system of claim 1 wherein said cooling system comprises at least one fluid passage for circulating a coolant near said pilot fuel cavity for cooling said pilot fuel therein.

23. The fuel injection system of claim 1 wherein said pilot fuel injection valve and said gaseous fuel injection valve are integrated in a combined valve assembly.

24. The fuel injection system of claim 23 wherein said pilot fuel injection valve and said gaseous fuel injection valve have concentric valve members and said gaseous fuel injection valve is disposed within an annular space surrounding said pilot fuel injection valve.

25. The fuel injection system of claim 24 wherein said first valve body is movable within said combined valve assembly and functions as said second valve member for said gaseous fuel injection valve.

26. A pilot fuel injection valve for injecting a liquid pilot fuel directly into a combustion chamber of an internal combustion engine that consumes a gaseous fuel as its main fuel, said pilot fuel injection valve comprising:

(a) a valve body;
(b) a nozzle associated with an end of said valve body, wherein said nozzle is positionable within said combustion chamber during a pilot fuel injection event so that said pilot fuel is introducible into said combustion chamber through said nozzle;
(c) a pilot fuel cavity disposed within said valve body near said nozzle;
(d) a valve member movable within said valve body to stop or allow pilot fuel flow from said pilot fuel cavity to said nozzle;
(e) a pilot fuel supply passage disposed within said injection valve body and communicating between a pilot fuel supply port and said pilot fuel cavity;
(f) a cooling system operable for cooling pilot fuel held within said fuel injection valve to maintain a pilot fuel temperature below the initial boiling point of said pilot fuel when said engine is running;
wherein said nozzle is thermally insulated from the rest of said valve body so that surfaces of said nozzle that face said combustion chamber can maintain a temperature that is higher than the final boiling point of said pilot fuel when said engine is running; and
wherein said cooling system comprises a drain passage leading from said pilot fuel cavity to a drain system so that pilot fuel can flow through said valve body.

27. The pilot fuel injection valve of claim 26 wherein said nozzle comprises a ceramic coating.

28. The pilot fuel injection valve of claim 27 wherein said ceramic coating has a thermal conductivity that is less than or equal to about 10 W/mK.

29. The pilot fuel injection valve of claim 26 wherein said nozzle is made from a first material and said valve body is made from a second material, and said first material has a lower thermal conductivity than said second material.

30. The pilot fuel injection valve of claim 29 wherein said first material is ceramic.

31. The pilot fuel injection valve of claim 29 wherein said second material is tool steel.

32. The pilot fuel injection valve of claim 26 wherein said cooling system further comprises a drain valve for controlling mass flow rate through said drain passage.

33. The pilot fuel injection valve of claim 32 wherein said drain valve is disposed within said valve body.

34. The pilot fuel injection valve of claim 32 wherein said drain valve is operable to stop flow through said drain passage when cooling is not needed.

35. The pilot fuel injection valve of claim 32 wherein said drain valve opens when pilot fuel pressure within said pilot fuel cavity is higher than a predetermined pressure and a controller is operable to control pilot fuel pressure within said pilot fuel cavity.

36. The pilot fuel injection valve of claim 26 wherein said cooling system comprises at least one fluid passage for circulating a coolant near said pilot fuel cavity for cooling said pilot fuel therein.

37. The pilot fuel injection valve of claim 26 further comprising a gaseous fuel injection valve integrated therewith in a combined valve assembly.

38. The pilot fuel injection valve of claim 37 wherein said gaseous fuel injection valve is disposed within an annular space surrounding said pilot fuel injection valve.

39. The pilot fuel injection valve of claim 38 wherein said fuel injection valve body is movable within said combined valve assembly and functions as a needle for said gaseous fuel injection valve.

40. The pilot fuel injection valve of claim 37 wherein said gaseous fuel injection valve comprises a gaseous fuel nozzle that is thermally insulated from the rest of said combined valve assembly so that surfaces of said gaseous fuel nozzle that face said combustion chamber can maintain a temperature above the final boiling point of said pilot fuel when said engine is running.

41. The pilot fuel injection valve of claim 40 wherein said gaseous fuel nozzle comprises a ceramic coating.

42. The pilot fuel injection valve of claim 41 wherein said ceramic coating has a thermal conductivity that is less than or equal to about 10 W/mK.

43. The pilot fuel injection valve of claim 40 wherein said gaseous fuel nozzle is made from a first material and a body for said combined valve assembly is made from a second material, and said first material has a lower thermal conductivity than said second material.

44. A combined valve assembly mountable in a cylinder head of an internal combustion engine for injecting a gaseous fuel and a liquid pilot fuel directly into a combustion chamber of said engine, said combined valve assembly comprising:
(a) a pilot fuel injection valve comprising:
a first valve body;
a first nozzle associated with an end of said first valve body, wherein said first nozzle is positionable within said combustion chamber during a pilot fuel injection event so that said pilot fuel is introducible into said combustion chamber through said first nozzle;
a pilot fuel cavity disposed within said injection valve body near said first nozzle;
a first valve member movable within said first valve body to stop or allow pilot fuel flow from said pilot fuel cavity to said first nozzle;
a pilot fuel supply passage disposed within said first valve body and communicating between a pilot fuel supply port and said pilot fuel cavity;
a cooling system operable for cooling pilot fuel held within said pilot fuel injection valve to maintain a pilot fuel temperature below the initial boiling point of said pilot fuel when said engine is running; and
(b) a gaseous fuel injection valve comprising:
a second valve body;
a second nozzle associated with an end of said second valve body, wherein said gaseous fuel is introducible through said second nozzle into said combustion chamber during a gaseous fuel injection event;
a gaseous fuel cavity disposed within said second valve body near said second nozzle;
a second valve member movable within said second valve body to stop or allow gaseous fuel flow from said gaseous fuel cavity to said second nozzle;
a gaseous fuel supply passage disposed within said second valve body and communicating between a gaseous fuel supply port and said gaseous fuel cavity;
wherein the pilot fuel injection valve and said gaseous fuel injection valve cooperate together to fuel the internal combustion engine and said first and second nozzles are each thermally insulated from said respective first and second valve bodies so that surfaces of said first and second nozzles that can come into contact with vaporized pilot fuel within said combustion chamber can maintain a temperature that is higher than the final boiling point of said pilot fuel when said engine is running.

45. The combined valve assembly of claim 44 wherein said pilot fuel injection valve and said gaseous fuel injection valve are concentric with said first valve body disposed within said second valve body.

46. The combined valve assembly of claim 45 wherein said first valve body is movable within said second valve body and also functions as said second valve member.

47. The combined valve assembly of claim 44 further comprising a ceramic coating on the surfaces of said first and second nozzles that can come into contact with vaporized pilot fuel within said combustion chamber.

48. The combined valve assembly of claim 47 wherein said ceramic coating has a thermal conductivity that is less than or equal to about 10 W/mK.

49. The combined valve assembly of claim 44 wherein said first and second nozzles are each made from a material with a thermal conductivity that is less than or equal to about 10 W/mK.

50. The combined valve assembly of claim 49 wherein at least one of said first and second nozzles is made from a ceramic material.

51. A method of operating a gaseous fuelled internal combustion engine with liquid pilot fuel ignition, said method comprising:
injecting a liquid pilot fuel directly into a combustion chamber through a nozzle of a pilot fuel injection valve that is mounted in a cylinder head of said engine with said nozzle protruding into said combustion chamber;
cooling said liquid pilot fuel within said pilot fuel injection valve to maintain a pilot fuel temperature therein that is lower than the initial boiling point of said liquid pilot fuel;
thermally insulating said nozzle so that surfaces that can come into contact with pilot fuel within said combustion chamber can maintain a surface temperature that is above a temperature where condensation of said liquid pilot fuel results in the formation of deposits that interfere with operation of said pilot fuel injection valve; and
introducing a gaseous fuel into said combustion chamber.

52. The method of claim 51 wherein said nozzle has a coating with a thermal conductivity less than or equal to about 5 W/mK.

53. The method of claim 52 wherein said coating is ceramic.

54. The method of claim 51 wherein said nozzle is made from a material with a thermal conductivity less than or equal to about 10 W/mK.

55. The method of claim 54 wherein said nozzle is made from a ceramic material.

56. The method of claim 51 wherein said gaseous fuel is introduced into said combustion chamber by injecting said gaseous fuel directly into said combustion chamber through a gaseous fuel nozzle that is mounted in said cylinder head with said gaseous fuel nozzle protruding into said combustion chamber, said method further comprising thermally insulating said gaseous fuel nozzle so that surfaces that can come into contact with pilot fuel within said combustion chamber can maintain a surface temperature higher than the final boiling point of said liquid pilot fuel.

57. The method of claim 56 wherein said gaseous fuel nozzle has a coating with a thermal conductivity less than or equal to about 5 W/mK.

58. The method of claim 57 wherein said coating is ceramic.

59. The method of claim 56 wherein said gaseous fuel nozzle is made from a material with a thermal conductivity less than or equal to about 10 W/mK.

60. The method of claim 59 wherein said gaseous fuel nozzle is made from a ceramic material.

61. The method of claim 51 wherein said liquid pilot fuel has a final boiling point that is less than 200° C.

* * * * *